J. J. AURYNGER.
DETECTOR CONDENSER.
APPLICATION FILED JUNE 24, 1918.
1,359,310.
Patented Nov. 16, 1920.
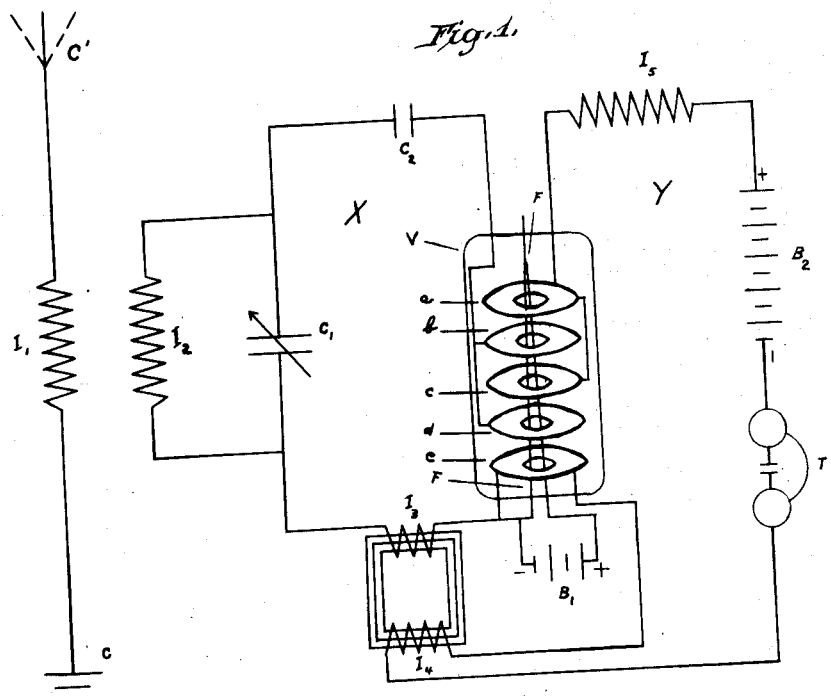
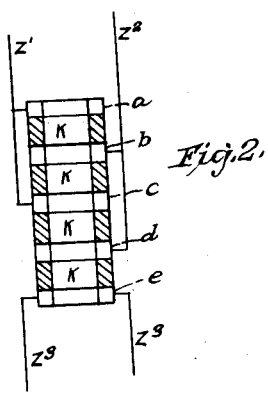
WITNESS:
INVENTOR
John J. Aurynger.
BY
ATTORNEY.

UNITED STATES PATENT OFFICE.

JOHN J. AURYNGER, OF BROOKLYN, NEW YORK.

DETECTOR-CONDENSER.

1,359,310.  Specification of Letters Patent.  Patented Nov. 16, 1920.

Application filed June 24, 1918. Serial No. 241,505.

*To all whom it may concern:*

Be it known that I, JOHN J. AURYNGER, a citizen of the United States, residing at Brooklyn, in the county of Kings and State of New York, have invented certain new and useful Improvements in Detector-Condensers, of which the following is a specification.

The object of the invention is to provide a means whereby high frequency oscillations are controlled in a receiving set; my invention relates to induction apparatus for setting in motion high frequency oscillations in local circuits.

I found that the detector does oscillate with equal charges of negative and positive electricity on both plates without rectification. Further reference to the action of condensers may be had in "*Lessons in Practical Electricity*" by C. Walton Swoope, page 318. Briefly, this is what takes place. A condenser transmits high frequency oscillating current which completely blocks the direct current, the latter being necessary to make the telephones operate. The dielectric of the condenser is the resistance which checks the direct current. The electromagnetic field of force set up by the filament is the means of discharging the condenser. While the dielectric does not cause rectification or alter the oscillations in any way, the current which passes in the circuit in the direction away from the detector is an intermittent current in one direction only. I have seen the intelligent observations of beat circuits which have appeared in the *Wireless Age*. No reference has been found among vacuum receivers that a condenser is a detector. The condenser plates change the sign of polarity with every oscillation in the absence of rectification.

I found that all oscillations accumulate in the detector and beat oscillations in a single capacity separate from the condenser but in the same magnetic field.

Dielectric capacity is the relation between positive and negative electricity and increases with the nearness of the two charges to each other. A condenser is more than that and is the relation of positive electricity to negative electricity with a nonconducting plate or medium between the charges; increasing the number of devices enlarges the condenser.

The invention consists in tuning condensers to the intervals of beats and measures. The path of the damped and undamped waves is in the condenser. An additional capacity for undamped beat oscillations provides a branch circuit to the main path through the condenser.

In the accompanying drawing, Figure 1 represents the detector condenser with connections for the receiving circuit and Fig. 2 represents a cross section view of the condenser plates.

In the primary circuit $I_1$ is an inductance between the aerial capacity $C'$ and a capacity forming the earth, $C$.

The local circuit is divided by a loop of which the detector is the center into the two branches, X and Y. The regenerative circuit is divided into the X branch which contains the condensers $C_1$ and $C_2$ together with inductances $I_2$ and $I_3$ and the Y branch which contains inductances $I_4$ and $I_5$, high potential battery $B_2$ and telephones T.

The capacities $a$, $c$ and $b$, $d$ are balanced by a periodic oscillating current when one plate is positive and the other is negative or vice versa. The principle involved is the production of pulsating current in one direction by a variable resistance introduced in the circuit and the input and the output circuits act in unison similar in respect to a microphone.

Induction through the insulation between the condenser plates $a$, $b$, $c$ and $d$ transfers the oscillations to the other branch of the loop in which are the telephones T, battery $B_2$, and inductance $I_5$.

A transformer is in one branch of the loop by inductance $I_3$, and in the other branch by inductance $I_4$. The transformer has an iron core of the closed core type. The current to produce the beat oscillations is passed first through inductance $I_3$, and at the same time saturates the core with magnetic flux. On its return from counterpoise capacity "$e$," the current enters the transformer again at inductance $I_4$. The magnetic field surrounding the coil reacts on the core and pulsating current is produced in the telephone branch of the circuit.

V is the exhausted glass tube. The filament F is bare tungsten wire and runs longitudinal to the condenser cutting through the aluminum condenser plates $a$, $b$, $c$, and $d$ and also the single capacity "$e$" when it passes through the holes in the plates. When the filament emits an electromagnetic field of force on connection with battery $B_1$, it enters into the detector as a part joined with the vacuum. The plates are connected in pairs, $a$ to $c$ and $b$ to $d$; $b$ is externally joined in series with condenser $C^2$. The vacuum is the nonconducting medium between the plates. When mica K, as shown by the cross section view of Fig. 2 is placed between the plates in a vacuum, the plates never touch adjoining metal.

A condenser blocks a direct current but will permit the passage of an oscillating current. It follows from this law that the members of the receiving apparatus have a fixed relation to one another. The sensitiveness may be increased by changing the material of which the apparatus is made and by the multiplication of the whole and any part of the system.

Fig. 2 is a longitudinal cross-section view of the plates and mica insulation. The plates, $a$, $b$, $c$, $d$, and $e$ are separated by mica, K. The number of condensers is determined by the number of pairs of connections, $Z'$, $Z^2$ and $Z^3$.

I claim:

1. In an electrical unit, an independent wire filament insulated from and passing through perforations in similar metallic plates which are separated by a nonionizable dielectric in an evacuated vessel, an input terminal connected to certain of said plates and an output terminal connected to other of said plates.

2. In an electrical unit, an independent wire filament inclosed with and by metallic plates and passing through perforations in said plates, a nonionizable dielectric between said plates in an evacuated vessel, said plates forming electrodes which are similar for the purpose described.

3. In an electrical unit, a detector with a plural number of plates with insulating material of high resistance between said plates in an evacuated vessel; the plates and insulation having perforations in alinement through which the filament passes.

4. In an electrical unit, a wire filament, a plural number of plates and a separate plate with a nonionizable dielectric between said plates in an evacuated vessel, the said first mentioned plates being alternately connected for the purpose described.

5. In an electrical unit, a wire filament, a plural number of metallic plates and a separate metallic plate with a nonionizable dielectric between said plates in an evacuated vessel in which the dielectrics between said plates and between the plates and the filament are separate elements for the purpose described.

JOHN J. AURYNGER.

Witnesses:
J. HENRY BROWN,
R. W. BEALL.